United States Patent
Yokoyama et al.

(10) Patent No.: US 10,057,262 B2
(45) Date of Patent: Aug. 21, 2018

(54) DEVICE AND AUTHENTICATION SYSTEM

(71) Applicant: Toppan Printing Co., Ltd., Taito-ku, Tokyo (JP)

(72) Inventors: Kiichi Yokoyama, Tokyo (JP); Moyuru Kobayashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 63 days.

(21) Appl. No.: 14/973,529

(22) Filed: Dec. 17, 2015

(65) Prior Publication Data

US 2016/0105437 A1 Apr. 14, 2016

Related U.S. Application Data

(63) Continuation of application No. PCT/JP2014/067801, filed on Jul. 3, 2014.

(30) Foreign Application Priority Data

Jul. 4, 2013 (JP) .................................. 2013-140582

(51) Int. Cl.
*H04L 29/06* (2006.01)
*G06F 21/44* (2013.01)
*H04L 9/32* (2006.01)

(52) U.S. Cl.
CPC .......... *H04L 63/0876* (2013.01); *G06F 21/44* (2013.01); *H04L 9/3271* (2013.01); *H04L 9/3278* (2013.01)

(58) Field of Classification Search
CPC . H04L 63/0876; H04L 9/3271; H04L 9/3278; G06F 21/44
See application file for complete search history.

(56) References Cited

U.S. PATENT DOCUMENTS 6,112,187 A 8/2000 Fukawa
7,958,347 B1 * 6/2011 Ferguson ................ H04L 9/321
713/155

(Continued)

FOREIGN PATENT DOCUMENTS

CN 1199892 A 11/1998
JP H10-247140 9/1998
(Continued)

OTHER PUBLICATIONS

Ruj et al., "Securing Home Networks Using Physically Unclonable Functions", Jul. 2012, Fourth International Conference on Ubiquitous and Future Networks (ICUFN), pp. 288-293 (Year: 2012).*

(Continued)

*Primary Examiner* — Kenneth W Chang
(74) *Attorney, Agent, or Firm* — Foley & Lardner LLP

(57) ABSTRACT

A device includes a storage unit that stores generated challenges which are challenges previously generated, a determination unit that determines whether a newly generated challenge matches any of the generated challenges or not, an output unit that outputs the newly generated challenge as an unused challenge when the determination unit determines that the newly generated challenge does not match any of the generated challenges, and a registration unit that stores the newly generated challenge as a new generated challenge in the storage unit when the determination unit determines that the newly generated challenge does not match any of the generated challenges.

5 Claims, 7 Drawing Sheets

(56) References Cited

U.S. PATENT DOCUMENTS

| | | | |
|---|---|---|---|
| 2009/0083833 A1* | 3/2009 | Ziola | G06F 21/31 |
| | | | 726/2 |
| 2010/0176920 A1* | 7/2010 | Kursawe | G06F 21/602 |
| | | | 340/5.74 |
| 2010/0250936 A1 | 9/2010 | Kusakawa et al. | |
| 2011/0002461 A1* | 1/2011 | Erhart | H04L 9/302 |
| | | | 380/44 |
| 2013/0160098 A1* | 6/2013 | Carlson | G06F 21/45 |
| | | | 726/6 |
| 2013/0205370 A1* | 8/2013 | Kalgi | H04W 12/10 |
| | | | 726/3 |
| 2014/0189828 A1* | 7/2014 | Baghdasaryan | H04L 63/0861 |
| | | | 726/6 |

FOREIGN PATENT DOCUMENTS

| | | |
|---|---|---|
| JP | H10-322327 A | 12/1998 |
| JP | 2007-049649 A | 2/2007 |
| JP | 2010-226603 A | 10/2010 |

OTHER PUBLICATIONS

Extended European Search Report issued in EP Patent Application No. 14819443.4 dated Jan. 30, 2017.
International Search Report issued in PCT/JP2014/067801 dated Oct. 7, 2014.
Chinese Office Action dated Feb. 6, 2018 in corresponding application No. 2014800358113.

* cited by examiner

FIG.1
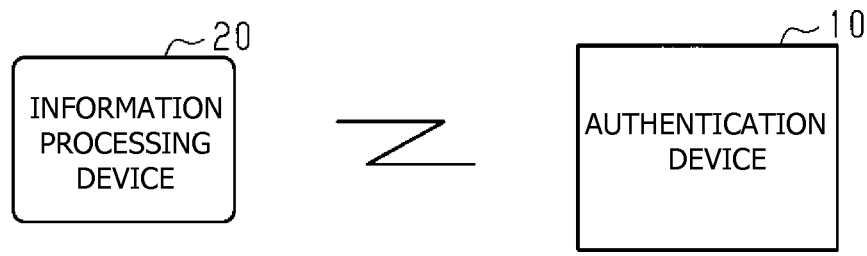
FIG.2
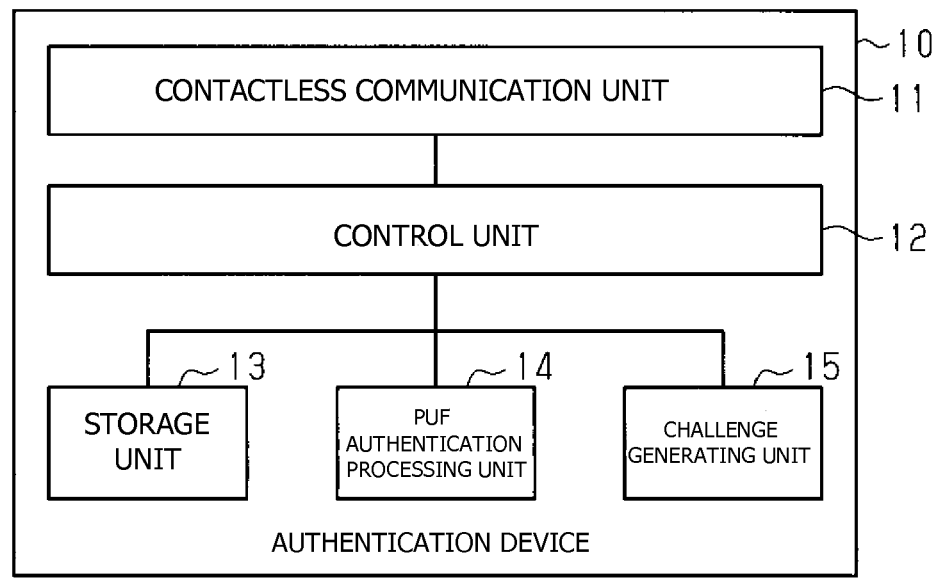
FIG.3
| No | ID | CHALLENGE | AT THE TIME OF GENERATION |
|---|---|---|---|
| 1 | UID001 | 1234567 | 20120901121534 |
| 2 | UID002 | 4902485 | 20120926140122 |
| 3 | UID001 | 8278372 | 20121115090345 |
| 4 | UID001 | 1739587 | 20121203100101 |
| 5 | UID002 | 4029938 | 20121210213310 |
| 6 | UID001 | 6938278 | 20121214200821 |
| 7 | UID002 | 6579132 | 20121221085633 |
| ⋮ | ⋮ | ⋮ | ⋮ |

| ID | PUF PARAMETER |
|---|---|
| UID001 | XHDKFO1DHFNDSJ |
| UID002 | NDOJUSUFNPSKHV |
| ⋮ | ⋮ |

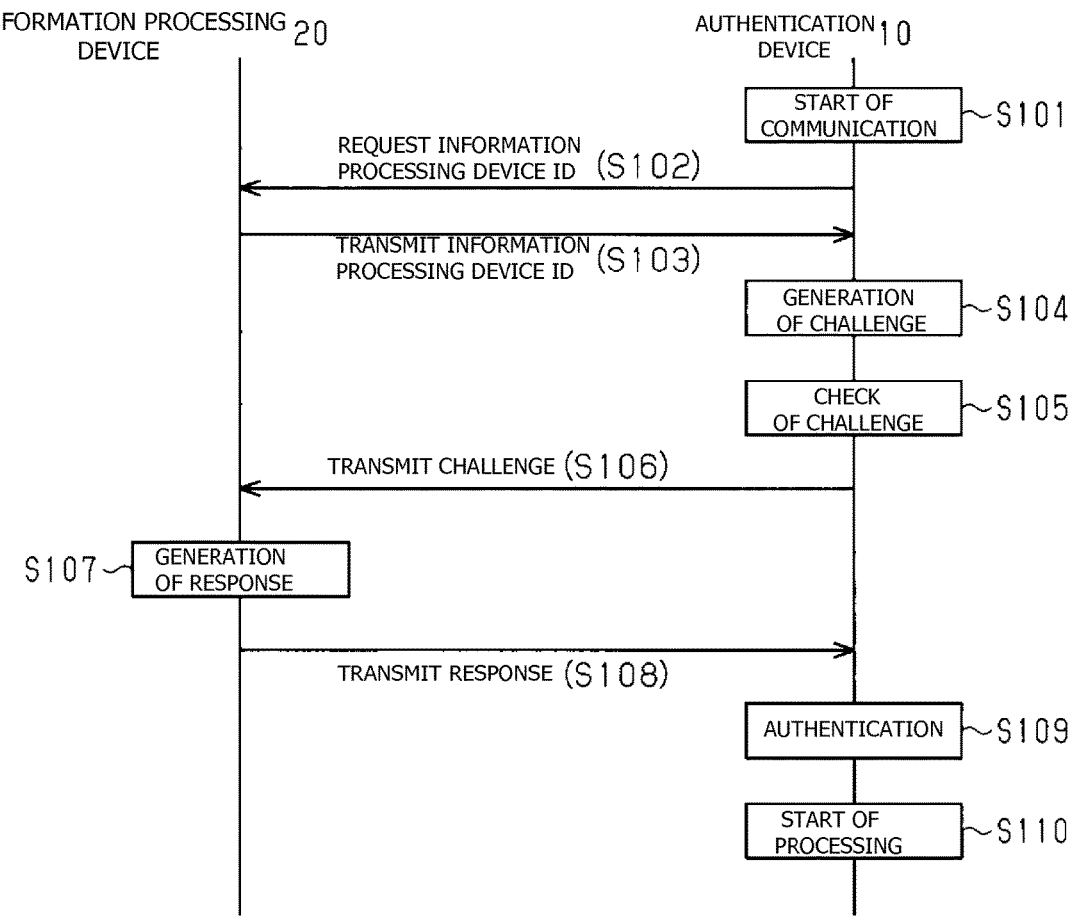
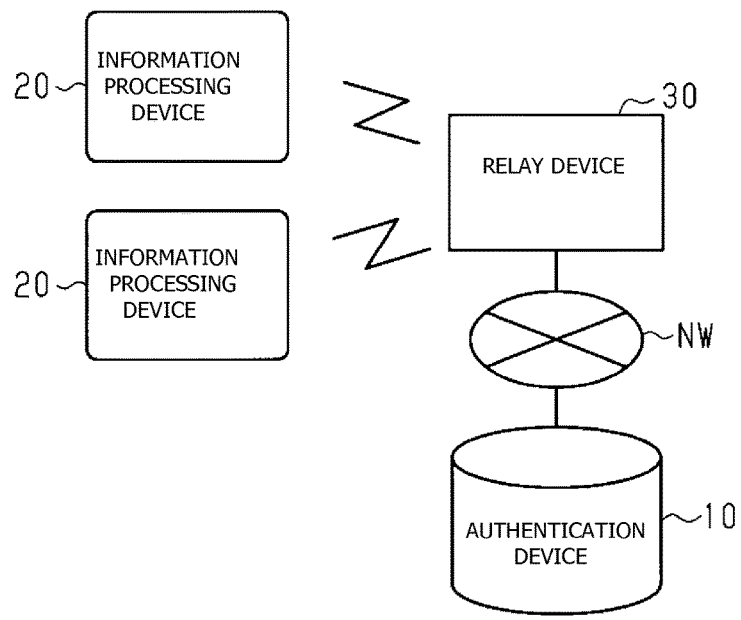

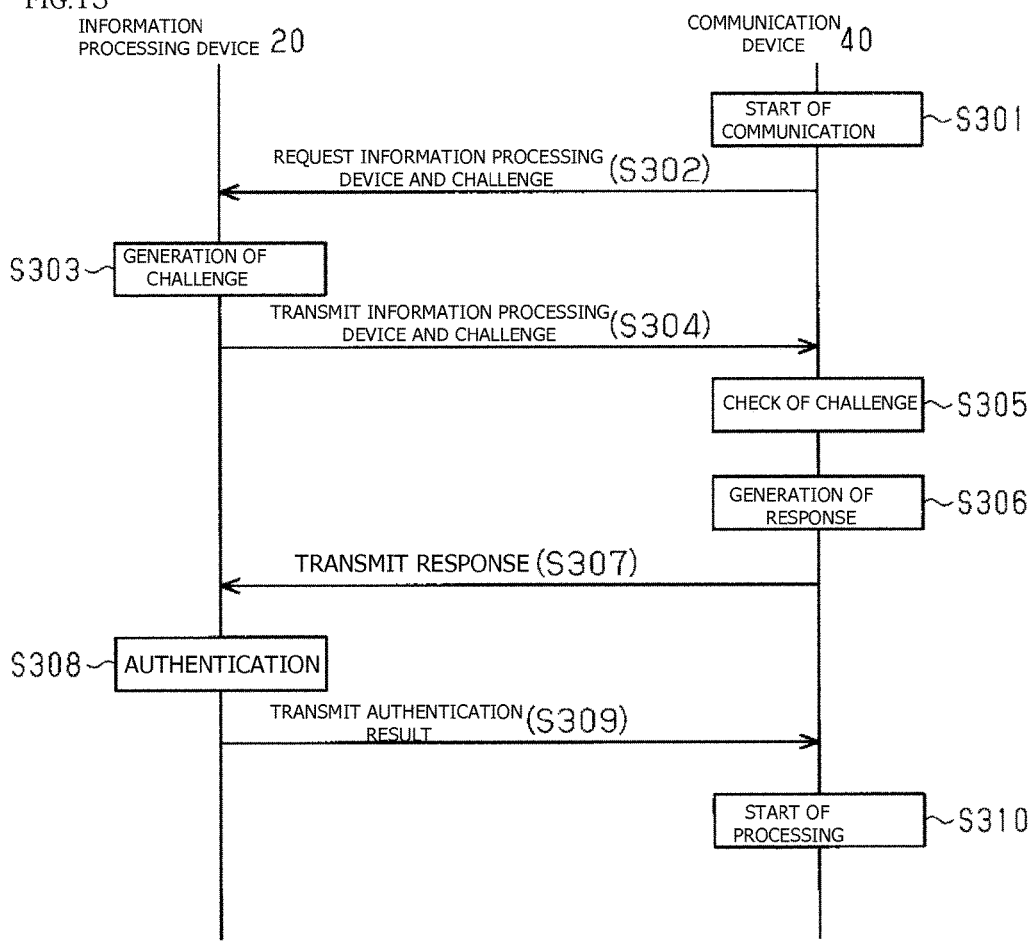

DEVICE AND AUTHENTICATION SYSTEM

CROSS-REFERENCE TO RELATED PATENT APPLICATIONS

This application is a continuation application filed under 35 U.S.C. 111(a) claiming the benefit under 35 U.S.C. §§ 120 and 365(c) of PCT International Application No. PCT/JP2014/067801 filed on Jul. 3, 2014, which is based upon and claims the benefit of priority of Japanese Application No. 2013-140582, filed on Jul. 4, 2013, the entire contents of them all are hereby incorporated by reference.

TECHNICAL FIELD

The present invention relates to authentication devices and systems.

BACKGROUND

There are known authentication protocols for authentication of IC cards, IC tags and the like, in which special processing is applied to the command or data used for the authentication in order to protect information necessary for the authentication from being intercepted or wiretapped.

One of such authentication protocols is known as a challenge-response protocol (for example, see PTL 1). According to this authentication protocol, an information processing device to be authenticated such as an IC card or an IC tag sends an authentication request to an authentication device such as an IC reader, and the authentication device replies by sending a challenge, which is a random value, to the information processing device. The information processing device generates a response on the basis of the received challenge and a specific value being processed under an authentication algorithm, and transmits the generated response to the authentication device.

The authentication device also generates a response on the basis of the challenge transmitted to the information processing device and a specific value pre-registered in the authentication device, and compares the generated response with the response received from the information processing device. When the two responses match each other, authentication is successful. On the other hand, when the two responses do not match each other, authentication is unsuccessful.

In the above authentication protocol, the response is generated by using a one-way function or the like. Accordingly, even if only the response is leaked, it is impossible to obtain the original challenge from the response. Therefore, the above authentication protocol can achieve high security.

CITATION LIST

Patent Literature

Patent Literature 1: JP-A-H10-247140

SUMMARY OF THE INVENTION

Technical Problem

However, if a set of challenge and response is intercepted or wiretapped, the response which is paired with the challenge is leaked. As a result, the security of authentication is compromised when the authentication device performs authentication by again generating the challenge which is the same as the challenge intercepted or wiretapped. Particularly, in the case where authentication is frequently performed, interception or wiretapping of challenge and response leads to an increased risk of improper authentication.

An object of the present invention is to provide a device and an authentication system which can achieve high security even if a set of challenge and response is intercepted or wiretapped.

Solution to Problem

A device that attempts to improve or solve the above problem includes a storage unit that stores generated challenges which are challenges previously generated, a determination unit that determines whether a newly generated challenge matches any of the generated challenges or not, an output unit that outputs the newly generated challenge as an unused challenge when the determination unit determines that the newly generated challenge does not match any of the generated challenges, and a registration unit that stores the newly generated challenge as a new generated challenge in the storage unit when the determination unit determines that the newly generated challenge does not match any of the generated challenges.

In the above device, it is preferable that the registration unit deletes the generated challenges from the storage unit when a predetermined period of time has elapsed.

It is possible that the above device further include a challenge generating unit that generates a challenge, the challenge generated by the challenge generating unit being the newly generated challenge, a challenge transmitting unit that transmits the unused challenge outputted from the output unit to an external device, a response receiving unit that receives a response generated by using the unused challenge from the external device, and an authentication processing unit that authenticates by using the unused challenge and the response received from the external device.

It is possible that the above device further include a challenge receiving unit that receives a challenge from the external device, a response generating unit that generates a response by using the unused challenge outputted from the output unit, and a response transmitting unit that transmits the response to the external device, wherein the determination unit determine whether the newly generated challenge matches any of the generated challenges or not by using the challenge received from the external device as the newly generated challenge.

An authentication system that solves the above problem includes a first device and a second device, the first device including a challenge generating unit that generates a challenge, a response receiving unit that receives a response, and an authentication processing unit that performs authentication by using the challenge and the response, one of the first device and the second device including a storage unit that stores generated challenges which are challenges previously generated, a determination unit that determines whether a newly generated challenge matches any of the generated challenges or not, an output unit that outputs the newly generated challenge as an unused challenge when the determination unit determines that the newly generated challenge does not match any of the generated challenges, and a registration unit that stores the newly generated challenge as a new generated challenge in the storage unit when the determination unit determines that the newly generated challenge does not match any of the generated challenges, and the second device including a response generating unit that generates the response by using the unused challenge, and a response transmitting unit that transmits the response.

In the above authentication system, it is preferable that the registration unit deletes the generated challenges from the storage unit when a predetermined period of time has elapsed.

In the above authentication system, it is possible that the second device includes a physical unclonable function (PUF), the response generating unit generates the response on the basis of the PUF by using the unused challenge, the first device includes a storage unit that stores PUF information which represents a property of the PUF contained in the second device, and the authentication processing unit performs authentication by using the unused challenge, the PUF information, and the response received from the second device.

In the above authentication system, it is possible that the first device includes a PUF, the authentication processing unit performs the authentication on the basis of the PUF, the second device includes a storage unit that stores PUF information which represents a property of the PUF contained in the first device, and the response generating unit generates the response by using the unused challenge and the PUF information.

It is preferable that the above authentication system further include a relay device, the relay device include a relay challenge receiving unit that receives the challenge from the first device, a relay challenge transmitting unit that transmits the challenge received by the relay challenge receiving unit to the second device, a relay response receiving unit that receives the response from the second device, and a relay response transmitting unit that transmits the response received by the relay response receiving unit to the first device, the first device transmits the challenge to the second device via the relay device, and the second device transmits the response to the first device via the relay device.

In the above authentication system, it is preferable that the relay device includes a PUF, a storage unit that stores the challenge received from the first device, and a relay response generating unit that generates a response on the basis of the PUF contained in the relay device by using the unused challenge, the relay response transmitting unit transmits the response received from the second device and the response generated by the relay response generating unit to the first device, and the authentication processing unit of the first device performs authentication by using the unused challenge, the response generated by the response generating unit of the second device, and the response generated by the relay response generating unit of the relay device.

Advantageous Effects of Invention

According to the present invention, a higher security can be achieved in the challenge-response authentication even if a set of challenge and response is intercepted or wiretapped.

BRIEF DESCRIPTION OF THE DRAWINGS

FIG. 1 is a configuration diagram which shows an example of configuration of an authentication system according to a first embodiment.

FIG. 2 is a configuration diagram which shows an example of configuration of an authentication device in the authentication system according to the first embodiment.

FIG. 3 is a view which shows an example of data configuration of a generated challenge which is stored in the authentication device according to the first embodiment.

FIG. 6 is a sequence diagram which shows an example of authentication procedure in the authentication system according to the first embodiment.

FIG. 7 is a configuration diagram which shows an example of configuration of the authentication system according to a second embodiment.

FIG. 13 is a sequence diagram which shows an example of authentication procedure in the authentication system according to the third embodiment.

DESCRIPTION OF REPRESENTATIVE EMBODIMENTS

First Embodiment

Figures 4, 5:
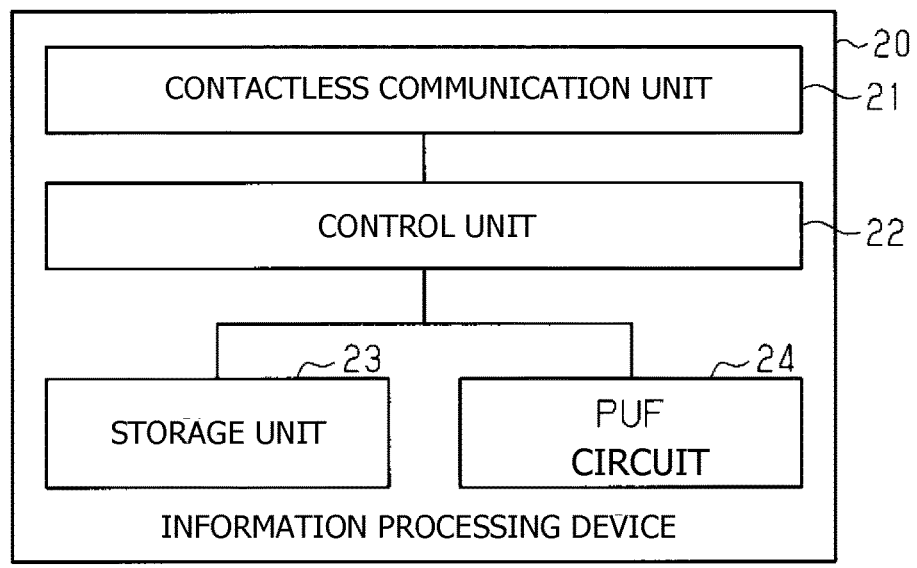
FIG. 4 is a view which shows an example of data configuration of PUF information which is stored in the authentication device according to the first embodiment.
FIG. 5 is a configuration diagram which shows an example of configuration of an information processing device in the authentication system according to the first embodiment.

With reference to the drawings, a first embodiment will be described.

As shown in FIG. 1, an authentication system includes an authentication device 10 and an information processing device 20. One example of the authentication device 10 is an IC reader/writer, and one example of the information processing device 20 is an IC tag.

As shown in FIG. 2, the authentication device 10 includes a contactless communication unit 11, a control unit 12, a storage unit 13, a PUF authentication processing unit 14 which is an example of authentication processing unit, and a challenge generating unit 15.

In the first embodiment, an example which uses a challenge-response authentication protocol using a physical unclonable function (PUF) will be described. A PUF is a function that extracts a difference in physical properties of ICs and reflects it to the output. The properties of ICs extracted by the PUF are physical properties which are different due to variation incurred during manufacturing of ICs, and are unclonable since they are unique to each IC. A PUF can be used for identification of ICs.

Specifically, a PUF circuit which is a specific circuit that outputs a value unique to each IC is provided in the ICs so that the output value from the PUF circuit is used for identification of ICs. For example, a delay time difference measurable arbiter PUF that generates a response based on the delay time difference between the signals generated in the PUF circuit is used.

The contactless communication unit 11 has a function as an interface for contactless communication between the authentication device 10 and the information processing device 20, and serves as a challenge transmitting unit and a response receiving unit.

The control unit 12 controls communication and information processing, and serves as a determination unit, a registration unit and an output unit.

The challenge generating unit 15 generates a challenge used for authentication. A challenge, which is typically a random number, varies at each time of generation. When a 32-bit challenge is used for authentication, approximately 4,300 million random numbers may be generated as a challenge by the challenge generating unit 15.

The storage unit 13 stores the challenges which have been previously generated by the challenge generating unit 15. As shown in FIG. 3, the challenges previously generated by the challenge generating unit 15 may be stored associated with each ID of the information processing device 20 which is a transmission destination of the challenge. The ID of the information processing device 20 is identification information of the information processing device 20, which is uniquely allocated to each information processing device 20.

Further, when the challenge-response authentication protocol based on the PUF is used, the storage unit 13 stores the IDs of the information processing devices 20 and parameters which represent correlation between input data and output data of the PUF circuits in the information processing devices 20, both being associated with each other as shown in FIG. 4. The parameter is an example of PUF information that indicates the properties of the PUF.

The PUF authentication processing unit 14 serves as a comparison response generating unit. Specifically, on receiving a response from the information processing device 20, the PUF authentication processing unit 14 reads out the parameter associated with the ID of the information processing device 20 from the storage unit 13, and generates a comparison response on the basis of the challenge transmitted to the information processing device 20 and the parameter read out from the storage unit 13. Then, the PUF authentication processing unit 14 compares the generated comparison response and the response received from the information processing device 20, and determines whether the comparison response matches the received response.

When the comparison result shows that two responses match each other, authentication is successful and the authentication device 10 can start processing. The processing performed by the authentication device 10 may include reading and writing of the data possessed by the information processing device 20. Specifically, management of IDs, money and points are performed. When the comparison result shows that two responses do not match each other, authentication is unsuccessful. Furthermore, if the matching rate of two responses is at least a predetermined threshold, the PUF authentication processing unit 14 may determine that two responses match each other.

The authentication device 10 is not limited to an IC reader/writer, and may be a mobile terminal such as smartphone and tablet computer, or an installation type device.

Alternatively, the authentication device 10 may perform contact communication with the information processing device 20. In this case, instead of the contactless communication unit 11, or in addition to the contactless communication unit 11, a contact communication unit as an interface for contact communication can be provided in the authentication device 10.

As shown in FIG. 5, the information processing device 20 includes a contactless communication unit 21, a control unit 22, a storage unit 23 and a PUF circuit 24, which is described above.

The contactless communication unit 21 has a function as an interface for contactless communication between the information processing device 20 and the authentication device 10, and serves as a challenge receiving unit and a response transmitting unit.

The control unit 22 controls communication and information processing, and serves as a response generating unit.

The storage unit 23 stores the data such as the IDs of the aforementioned information processing devices 20.

As described above, the PUF circuit 24 outputs an output value which is unique to each information processing device 20. The output value can be used for identification of ICs, and thus identification of the information processing devices 20.

The information processing device 20 is not limited to an IC tag, but may also be a mobile terminal such as IC card, smartphone which carries an IC, cell phone, and tablet computer.

Alternatively, the authentication device 10 may perform contact communication with the information processing device 20. In this case, instead of the contactless communication unit 21, or in addition to the contactless communication unit 21, a contact communication unit as an interface for contact communication can be provided in the information processing device 20.

With reference to FIG. 6, an example of flow of information processing in the first embodiment will be described.

As shown in FIG. 6, the information processing device 20 is brought closer to the authentication device 10, or alternatively, the information processing device 20 is connected to the authentication device 10 to start communication (step S101). When the communication starts, the authentication device 10 requests the ID of the information processing device 20 to the information processing device 20 (step S102). The information processing device 20 transmits the ID of the information processing device 20 to the authentication device 10 in response to the request from the authentication device 10 (step S103).

Then, the challenge generating unit 15 of the authentication device 10 generates a challenge (step S104). The control unit 12 of the authentication device 10 checks if the generated challenge matches any of the previously generated challenges (step S105). Specifically, the authentication device 10 compares a list of previously generated challenges which are the challenges stored in the storage unit 13 with the newly generated challenge. When the comparison result shows that the newly generated challenge does not match any of the generated challenges, the control unit 12 of the authentication device 10 outputs the newly generated challenge as an unused challenge to the contactless communication unit 11 so that the contactless communication unit 11 transmits the unused challenge to the information processing device 20 (step S106). Further, the control unit 12 of the authentication device 10 adds the newly generated challenge to the list of generated challenges by allowing the storage unit 13 to store the newly generated challenge.

When the comparison result shows that the newly generated challenge matches any of the challenges previously generated, the process returns to step S104, in which the authentication device 10 again generates a challenge. Then, the authentication device 10 checks if the generated challenge matches any of the previously generated challenges in step S105. The authentication device 10 repeats step S104 and step S105 until a challenge which is different from the previously generated challenges is generated.

When checking the challenge, the authentication device 10 may compare the challenges included in the list of the generated challenges with the newly generated challenge so that it determines the newly generated challenge as an unused challenge when the newly generated challenge does not match any of the generated challenges.

Alternatively, the authentication device 10 may check the challenge for each ID of the information processing device 20. That is, the authentication device 10 compares the challenges associated with the ID of the information processing device 20 which is the target of the current authentication, that is, the ID the same as that received from the information processing device 20 in step S103 among the generated challenges stored in the storage unit 13, with the newly generated challenge. When the comparison result shows that any of the generated challenges does not match the newly generated challenge, the authentication device 10 determines the newly generated challenge as an unused challenge even if any of the generated challenges associated with the ID of another information processing device 20 matches the newly generated challenge.

It is possible to achieve higher security in a configuration in which the challenges in the list of generated challenges are compared with the newly generated challenge.

When there is no unused challenge, or when a predetermined period of time has elapsed, the authentication device 10 may delete the generated challenge stored in the storage unit 13. For example, in the case where an expected usage life of the IC tag as the information processing device 20 is one year, the control unit 12 of the authentication device 10 deletes the challenge from the storage unit 13 when one year has elapsed from the generation of the challenge. Further, a starting point of the predetermined period of time is not only the time of generation of the challenge, but may be defined as appropriate.

When the contactless communication unit 21 of the information processing device 20 receives the challenge from the authentication device 10, the control unit 22 of the information processing device 20 generates a response by using the received challenge (step S107). When the authentication protocol based on PUF is used, the information processing device 20 generates a response by using an output value from the PUF circuit 24 which uses the received challenge as an input value.

The response generated by the information processing device 20 is transmitted from the contactless communication unit 21 of the information processing device 20 to the authentication device 10 (step S108).

The PUF authentication processing unit 14 of the authentication device 10 performs authentication by using the response received from the information processing device 20 via the contactless communication unit 11 of the authentication device 10 (step S109). Specifically, the storage unit 13 of the authentication device 10 generates a comparison response on the basis of the parameter of PUF which is stored associated with the ID the same as the ID received from the information processing device 20 at step S103 and the challenge transmitted to the information processing device 20. Then, the authentication device 10 compares the generated comparison response and the response received from the information processing device 20, and determines whether the comparison response matches the received response or not.

When the comparison result shows that two responses match each other, authentication is successful and the authentication device 10 starts processing (step S110). When the comparison result shows that two responses do not match each other, authentication is unsuccessful.

According to the aforementioned configuration, it is possible to achieve high security even if a set of the used challenge and response is intercepted or wiretapped since a challenge which has been used for authentication is prevented from being used again for authentication.

In the above example of information processing, an example is described in which the authentication device 10 authenticates the information processing device 20. However, so-called mutual authentication is also possible in which the information processing device 20 also authenticates the authentication device 10. The method of authenticating the authentication device 10 by the information processing device 20 may be a known method.

In the first embodiment, the authentication device 10 is an example of the first device and the information processing device 20 is an example of the second device. Further, the first device determines whether the newly generated challenge matches the generated challenge or not.

Second Embodiment

With reference to the drawings, a second embodiment will be described. The same elements as those of the first embodiment are denoted by the same reference characters, and the description thereof is omitted.

As shown in FIG. 7, the authentication system includes the authentication device 10, the information processing device 20 and a relay device 30. One example of the authentication device 10 is a server, one example of the information processing device 20 is an IC tag, and one example of the relay device 30 is an IC reader/writer. The authentication device 10 and the relay device 30 are connected to a network NW such as Internet.

In the authentication system according to the second embodiment, the authentication device 10 transmits one challenge to the relay device 30, and the relay device 30 can transmit the challenge to a plurality of information processing devices 20. Accordingly, the authentication device 10 can apply one challenge to a plurality of information processing devices 20 without generating a challenge for each of the information processing devices 20.

Figure 8:
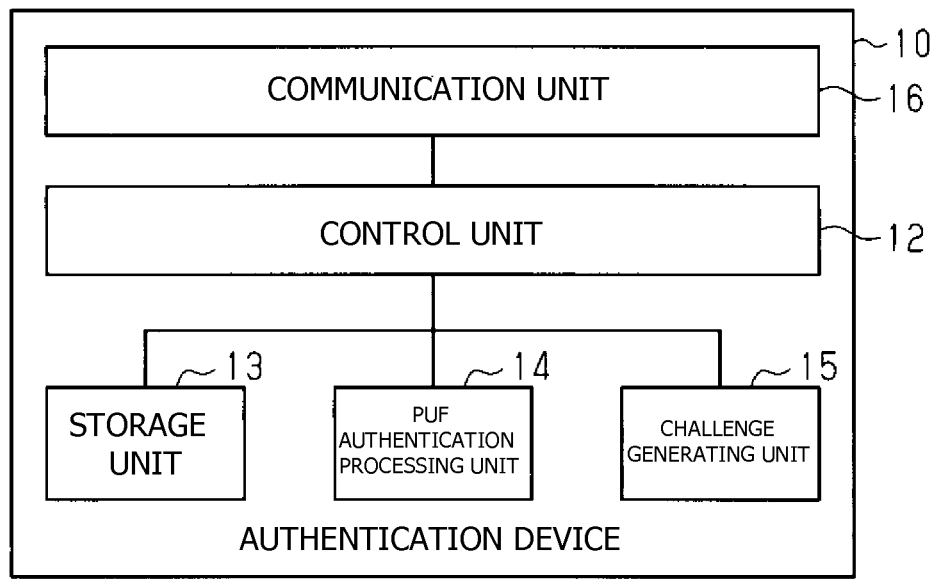
FIG. 8 is a configuration diagram which shows an example of configuration of an authentication device in the authentication system according to the second embodiment.

As shown in FIG. 8, the authentication device 10 includes a communication unit 16, the control unit 12 having the same configuration as that of the first embodiment, the storage unit 13, the PUF authentication processing unit 14 which is an example of authentication processing unit, and the challenge generating unit 15. Also in the second embodiment, an example in which the challenge-response authentication protocol using a PUF will be described. Only the information processing device 20 may have the PUF, or alternatively, both the information processing device 20 and the relay device 30 may have the PUF.

The communication unit 16 has a function as an interface for communication between the authentication device 10 and the relay device 30, and serves as a challenge transmitting unit and a response receiving unit.

The control unit 12 controls communication and information processing, and serves as a determination unit, a registration unit and an output unit.

The challenge generating unit 15 generates a challenge used for authentication.

The storage unit 13 stores the challenges which have been previously generated by the challenge generating unit 15. The challenges previously generated by the challenge generating unit 15 may be stored associated with each ID of the information processing device 20 which is a transmission destination of the challenge. Further, the challenges previously generated by the challenge generating unit 15 may be stored associated with each ID of the relay device 30 which is a transmission destination of the challenge. The ID of the relay device 30 is identification information of the relay device 30, which is uniquely allocated to each relay device 30.

Further, when the challenge-response authentication protocol based on the PUF of the information processing device 20 is used, the storage unit 13 stores the IDs of the information processing devices 20 and parameters which represent properties of the PUF of the information processing devices 20, both being associated with each other.

The PUF authentication processing unit 14 serves as a comparison response generating unit. Specifically, on receiving a response from the information processing device 20 via the relay device 30, the PUF authentication processing unit 14 reads out the parameter associated with the ID of the information processing device 20 from the storage unit 13, and generates a comparison response on the basis of the challenge transmitted to the information processing device 20 via the relay device 30 and the parameter read out from the storage unit 13. Then, the PUF authentication processing unit 14 compares the generated comparison response and the response received from the information processing device 20 via the relay device 30, and determines whether the comparison response matches the received response.

When the comparison result shows that two responses match each other, authentication is successful. On the other hand, when the comparison result shows that two responses do not match each other, authentication is unsuccessful. Furthermore, if the matching rate of two responses is at least a predetermined threshold, the PUF authentication processing unit 14 may determine that two responses match each other.

When the authentication protocol using the PUF of the relay device 30 in addition to the PUF of the information processing device 20 is used, the storage unit 13 stores the ID of the relay device 30 and parameters which represent properties of the PUF of the relay device 30, both being associated with each other.

On receiving a response from the relay device 30, the PUF authentication processing unit 14 reads out the parameter associated with the ID of the relay device 30 from the storage unit 13, and generates a comparison response on the basis of the challenge transmitted to the relay device 30 and the parameter read out from the storage unit 13. Then, the PUF authentication processing unit 14 compares the generated comparison response and the response received from the relay device 30, and determines whether the comparison response matches the received response.

When the comparison result shows that two responses match each other, authentication is successful. On the other hand, when the comparison result shows that two responses do not match each other, authentication is unsuccessful. Furthermore, if the matching rate of two responses is at least a predetermined threshold, the PUF authentication processing unit 14 may determine that two responses match each other.

The authentication device 10 is not limited to a server, and may be a mobile terminal such as smartphone and tablet computer.

The information processing device 20 has the same configuration as that of the information processing device 20 of the first embodiment shown in FIG. 5 except that the contactless communication unit 21 performs contactless communication with the relay device 30. In addition, the relay device 30 may perform contact communication with the information processing device 20. In this case, the information processing device 20 includes a contact communication unit.

Figure 9:
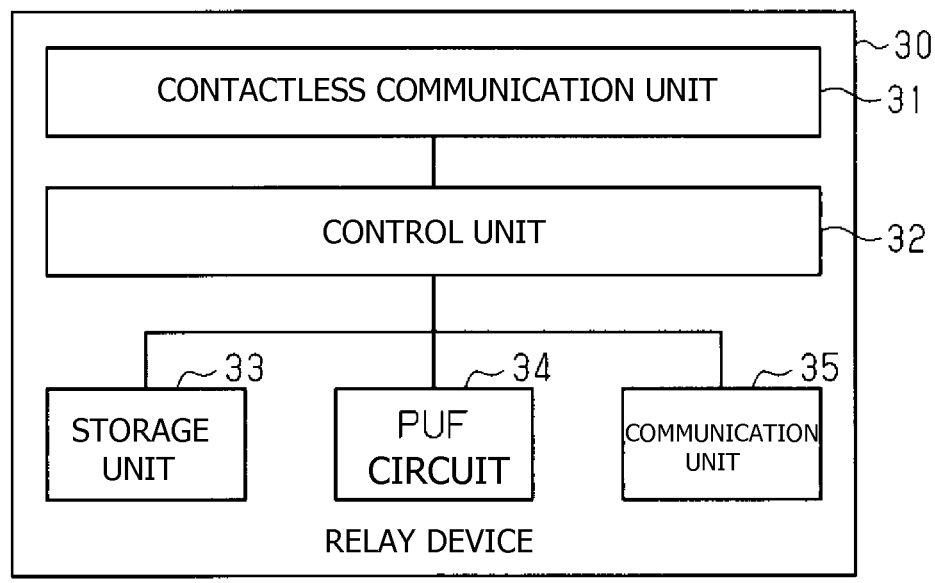
FIG. 9 is a configuration diagram which shows an example of configuration of a relay device in the authentication system according to the second embodiment.

As shown in FIG. 9, the relay device 30 includes a contactless communication unit 31, a control unit 32, a storage unit 33, a PUF circuit 34, and a communication unit 35.

The contactless communication unit 31 has a function as an interface for contactless communication between the relay device 30 and the information processing device 20, and serves as a relay challenge transmitting unit and a relay response receiving unit.

The control unit 32 controls communication and information processing, and serves as a relay response generating unit.

The storage unit 33 stores the data such as the IDs of the aforementioned relay device 30.

As described above, the PUF circuit 34 outputs an output value which is unique to each relay device 30. The output value can be used for identification of ICs, and thus identification of the relay devices 30. Authentication of the relay device 30 can be performed by using the authentication protocol using the PUF of the relay device 30. Specifically, if an improper relay device 30 is used, it is possible to detect that the relay device 30 is improper. Furthermore, when authentication of the relay device 30 using the PUF is not performed, the PUF circuit 34 may not be provided in the relay device 30.

The communication unit 35 has a function as an interface for communication between the relay device 30 and the authentication device 10, and serves as a relay challenge receiving unit and a relay response transmitting unit.

The relay device 30 is not limited to an IC reader/writer, and may be a mobile terminal such as smartphone and tablet computer, or an installation type device.

Alternatively, the relay device 30 may perform contact communication with the information processing device 20. In this case, instead of the contactless communication unit 31, or in addition to the contactless communication unit 31, a contact communication unit as an interface for contact communication can be provided in the relay device 30.

Figure 10:
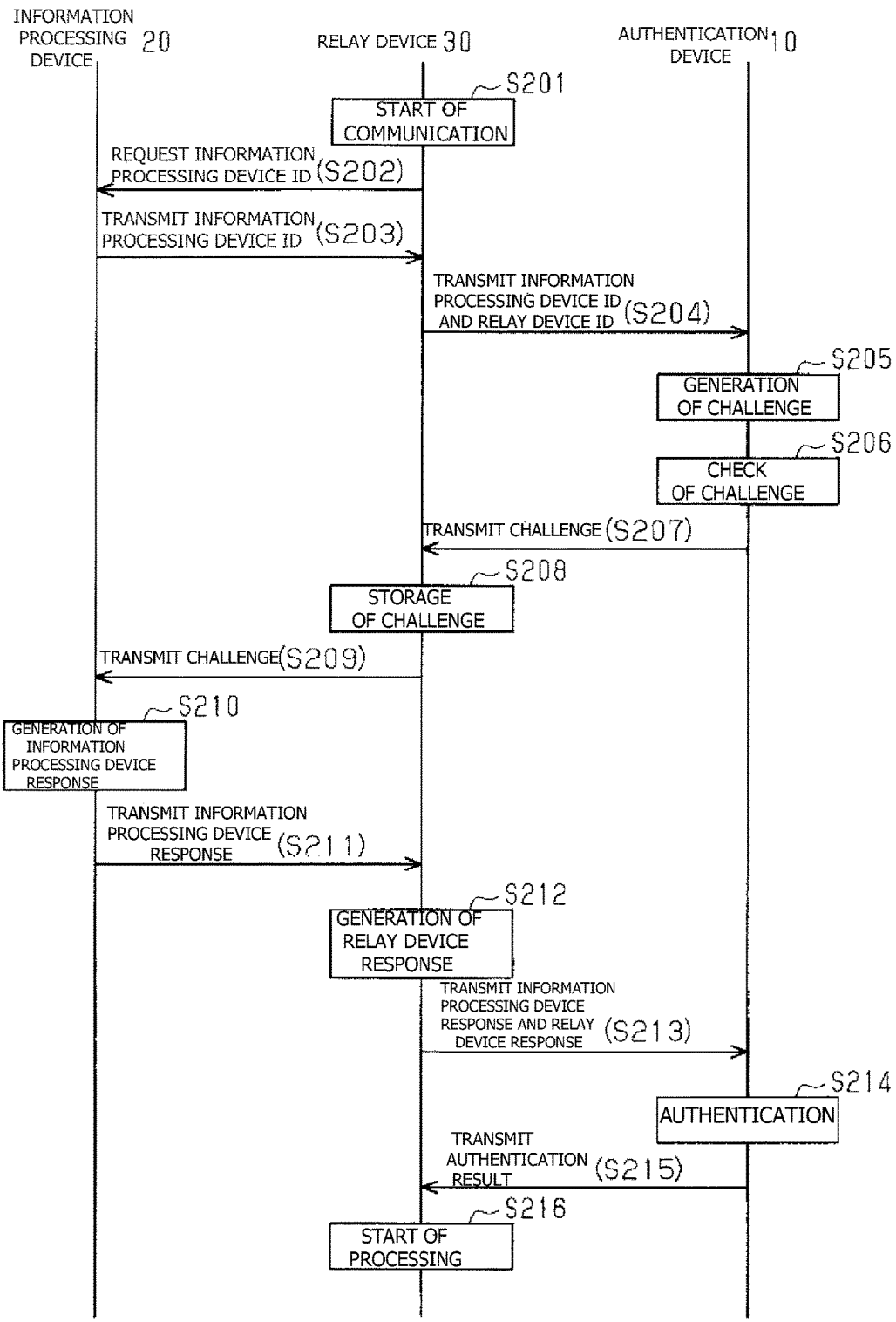
FIG. 10 is a sequence diagram which shows an example of authentication procedure in the authentication system according to the second embodiment.

With reference to FIG. 10, an example of flow of information processing in the second embodiment will be described.

As shown in FIG. 10, the information processing device 20 is brought closer to the relay device 30, or alternatively, the information processing device 20 is connected to the relay device 30 to start communication (step S201). When the communication starts, the relay device 30 requests the ID of the information processing device 20 to the information processing device 20 (step S202). The information processing device 20 transmits the ID of the information processing device 20 to the relay device 30 in response to the request from the relay device 30 (step S203).

Then, the relay device 30 transmits the ID of the information processing device 20 received from the information processing device 20 and the ID of the relay device 30 to the authentication device 10 (step S204). If there are a plurality of information processing devices 20, step S201 to step S204 are repeated for the number of information processing devices 20.

Then, the challenge generating unit 15 of the authentication device 10 generates a challenge (step S205). The control unit 12 of the authentication device 10 checks if the generated challenge matches any of the previously generated challenges (step S206). Specifically, the authentication device 10 compares a list of previously generated challenges which are the challenges stored in the storage unit 13 with the newly generated challenge. When the comparison result shows that the newly generated challenge does not match any of the generated challenges, the control unit 12 of the authentication device 10 outputs the newly generated challenge as an unused challenge to the communication unit 16 so that the communication unit 16 transmits the unused challenge to the relay device 30 (step S207). Further, the control unit 12 of the authentication device 10 adds the newly generated challenge to the list of generated challenges by allowing the storage unit 13 to store the newly generated challenge.

When the comparison result shows that the newly generated challenge matches any of the challenges previously generated, the process returns to step S205, in which the authentication device 10 again generates a challenge. Then, the authentication device 10 checks if the generated challenge matches any of the previously generated challenges in step S206. The authentication device 10 repeats step S205 and step S206 until a challenge which is different from the previously generated challenges is generated.

When checking the challenge, the authentication device 10 may compare the challenges included in the list of the generated challenges with the newly generated challenge. The authentication device 10 may check the challenge for each ID of the information processing device 20 or each ID of the relay device 30. It is possible to achieve higher security in a configuration in which the challenges in the list of generated challenges is compared with the newly generated challenge.

When there is no unused challenge, or when a predetermined period of time has elapsed, the authentication device 10 may delete the generated challenge stored in the storage unit 13. For example, in the case where an expected usage life of the IC tag as the information processing device 20 is one year, the control unit 12 of the authentication device 10 deletes the challenge from the storage unit 13 when one year has elapsed from the generation of the challenge. Further, a starting point of the predetermined period of time is not only the time of generation of the challenge, but may be defined as appropriate.

When the communication unit 35 of the relay device 30 receives the challenge from the authentication device 10, the relay device 30 stores the challenge by allowing the storage unit 33 to store the received challenge (step S208). Then, the contactless communication unit 31 of the relay device 30 transmits the challenge received from the authentication device 10 to the information processing device 20 (step S209). If there are a plurality of information processing devices 20, the relay device 30 transmits the challenge to each of the information processing devices 20.

When the contactless communication unit 21 of the information processing device 20 receives the challenge from the relay device 30, the control unit 22 of the information processing device 20 generates a response by using the received challenge (step S210). When the authentication protocol based on PUF is used, the information processing device 20 generates a response by using an output value from the PUF circuit 24 which uses the received challenge as an input value.

The response generated by the information processing device 20 is transmitted from the contactless communication unit 21 of the information processing device 20 to the relay device 30 The response generated by the information processing device 20 is transmitted from the contactless communication unit 21 of the information processing device 20 to the (step S211). If there are a plurality of information processing devices 20, each of the information processing devices 20 generate the response and transmit it to the relay device 30.

Then, the control unit 32 of the relay device 30 generates a response by using the challenge stored in step S208 (step S212). When the authentication of the relay device 30 by using the PUF is performed, the relay device 30 generates a response by using an output value from the PUF circuit 34 which uses the received challenge as an input value.

The communication unit 35 of the relay device 30 transmits the response generated by the information processing device 20 and the response generated by the relay device 30 to the authentication device 10 (step S213).

The PUF authentication processing unit 14 of the authentication device 10 performs authentication by using two responses that the communication unit 16 of the authentication device 10 has received from the relay device 30 (step S214). Specifically, the storage unit 13 of the authentication device 10 generates a comparison response on the basis of the parameter of PUF which is stored associated with the ID the same as the ID of the information processing device 20 received at step S204 and the challenge transmitted to the information processing device 20. Then, the authentication device 10 compares the generated comparison response and the response generated by the information processing device 20, and determines whether the comparison response matches the response generated by the information processing device 20 or not.

The storage unit 13 of the authentication device 10 generates a comparison response on the basis of the parameter of PUF which is stored associated with the ID the same as the ID of the relay device 30 received at step S204 and the challenge transmitted to the relay device 30. Then, the authentication device 10 compares the generated comparison response and the response generated by the relay device 30, and determines whether the comparison response matches the response generated by the relay device 30 or not.

When the comparison result shows that both responses match the comparison response, authentication is successful and the authentication device 10 transmits the authentication result to the relay device 30 (step S215). Then, the relay device 30 starts processing (step S216). The processing performed by the relay device 30 may include reading and writing of the data contained in the information processing device 20.

When the comparison result shows that one or both of the responses do not match the comparison response, authentication is unsuccessful.

According to the aforementioned configuration, it is possible to achieve high security even if a set of the used challenge and response is intercepted or wiretapped since a challenge which has been used for authentication is prevented from being used again for authentication.

In the above example of information processing, an example is described in which the authentication of the relay device 30 is performed, that is, the relay device 30 generates a response. However, the relay device 30 may not generate a response and the authentication of the relay device 30 may not be performed. In this case, authentication is performed by using only the response generated by the information processing device 20. Nonetheless, it is possible to achieve higher security in a configuration in which the authentication of the relay device 30 is performed since the use of improper relay device 30 can be prevented.

In the above example of information processing, an example is described in which the authentication device 10 authenticates the relay device 30 and the information processing device 20 at the same time. However, the authentication procedure by the authentication device 10 is not limited to that. For example, the authentication device 10 may first perform authentication of the relay device 30, and then perform authentication of the information processing device 20 when the authentication of the relay device 30 is successful.

Further, in the above example of information processing, an example is described in which the authentication device 10 authenticates both the relay device 30 and the information processing device 20. However, so-called mutual authentication is also possible in which the relay device 30 and the information processing device 20 also authenticates the authentication device 10. Authentication method performed by the relay device 30 and the information processing device 20 to authenticate the authentication device 10 may be a known method.

In the second embodiment, the authentication device 10 is an example of the first device and the information processing device 20 is an example of the second device. Further, the first device determines whether the newly generated challenge matches the generated challenge or not.

Third Embodiment

With reference to the drawings, a third embodiment will be described focusing on the difference from the first embodiment. The same elements as those of the first embodiment are denoted by the same reference characters, and the description thereof is omitted.

Similar to the first embodiment, the authentication system of the third embodiment includes a communication device 40 which is an IC reader/writer and the information processing device 20 such as an IC tag. Also in the third embodiment, an example which uses a challenge-response authentication protocol using a PUF will be described.

Figure 11:
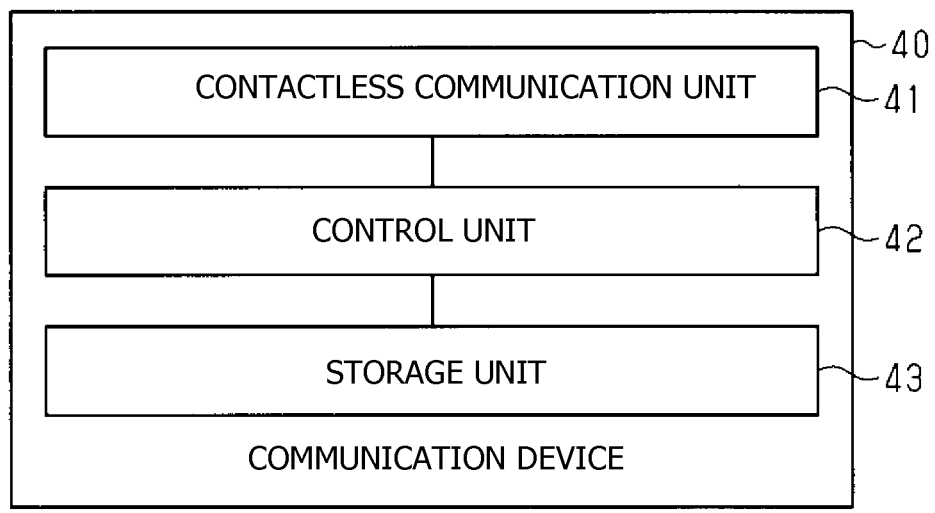
FIG. 11 is a configuration diagram which shows an example of a communication device in the authentication system according to a third embodiment.

As shown in FIG. 11, the communication device 40 includes a contactless communication unit 41, a control unit 42, and a storage unit 43.

The contactless communication unit 41 has a function as an interface for contactless communication between the communication device 40 and the information processing device 20, and serves as a challenge receiving unit and a response transmitting unit.

The control unit 42 controls communication and information processing, and serves as a determination unit, a registration unit, an output unit, and a response generating unit.

The storage unit 43 stores the challenges that the communication device 40 has received from the information processing device 20, that is, the challenges which have been previously generated by the information processing device 20. The challenges which have been previously generated by the information processing device 20 may be stored associated with each ID of the information processing device 20 which has generated the challenge. When the challenge-response authentication protocol based on the PUF is used, the storage unit 43 stores the IDs of the information processing devices 20 and parameters which represent properties of the PUF of the information processing devices 20, both being associated with each other.

The communication device 40 is not limited to an IC reader/writer, and may be a mobile terminal such as smartphone and tablet computer, or an installation type device.

Alternatively, the communication device 40 may perform contact communication with the information processing device 20. In this case, instead of the contactless communication unit 41, or in addition to the contactless communication unit 41, a contact communication unit as an interface for contact communication can be provided in the communication device 40.

Figure 12:
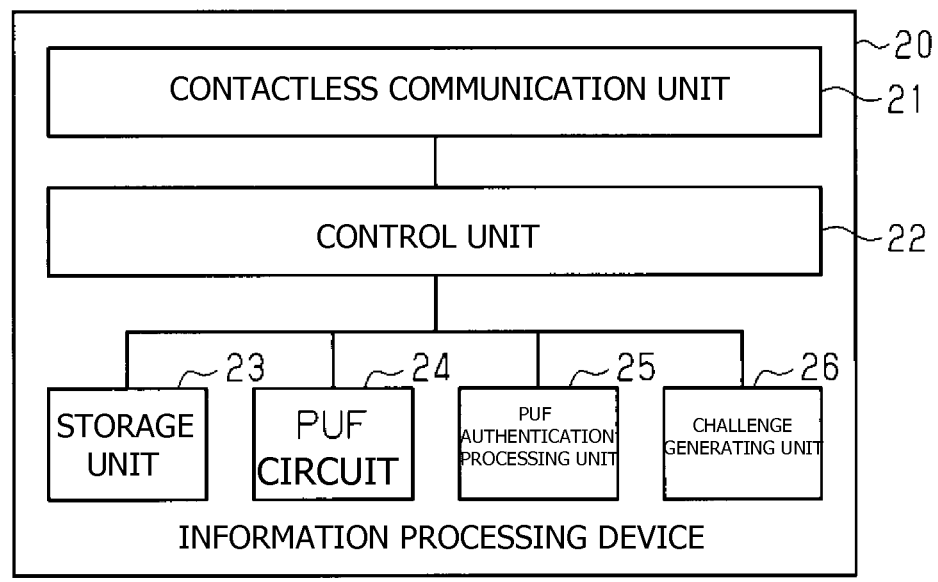
FIG. 12 is a configuration diagram which shows an example of configuration of the information processing device in the authentication system according to the third embodiment.

As shown in FIG. 12, the information processing device 20 includes the contactless communication unit 21, the control unit 22, the storage unit 23, the PUF circuit 24, a PUF authentication processing unit 25 which is an example of authentication processing unit, and a challenge generating unit 26.

The contactless communication unit 21 has a function as an interface for contactless communication between the information processing device 20 and the communication device 40, and serves as a challenge transmitting unit and a response receiving unit.

The control unit 22 controls communication and information processing.

The storage unit 23 stores the data such as the IDs of the information processing devices 20.

The PUF circuit 24 outputs an output value which is unique to each information processing device 20.

The challenge generating unit 26 generates a challenge used for authentication.

The PUF authentication processing unit 25 serves as a comparison response generating unit, and generates a comparison response on the basis of the challenge transmitted to the communication device 40 by using the PUF circuit 24. The PUF authentication processing unit 25 compares the generated comparison response and the response received from the communication device 40, and determines whether the comparison response matches the received response.

When the comparison result shows that two responses match each other, authentication is successful. On the other hand, when the comparison result shows that two responses do not match each other, authentication is unsuccessful. Furthermore, if the matching rate of two responses is at least a predetermined threshold, the PUF authentication processing unit 25 may determine that two responses match each other.

The information processing device 20 is not limited to an IC tag, and may be a mobile terminal such as IC card, smartphone which carries an IC, cell phone, and tablet computer.

Alternatively, the communication device 40 may perform contact communication with the information processing device 20. In this case, instead of the contactless communication unit 21, or in addition to the contactless communication unit 21, a contact communication unit as an interface for contact communication can be provided in the information processing device 20.

With reference to FIG. 13, an example of flow of information processing in the third embodiment will be described.

As shown in FIG. 13, the information processing device 20 is brought closer to the communication device 40, or alternatively, the information processing device 20 is connected to the communication device 40 to start communication (step S301). When the communication starts, the communication device 40 requests the information processing device 20 to transmit an ID of the information processing device 20 and a challenge (step S302).

In response to the request from the communication device 40, the challenge generating unit 26 of the information processing device 20 generates a challenge (step S303). The contactless communication unit 21 of the information processing device 20 transmits the generated challenge and the ID of the information processing device 20 to the communication device 40 (step S304).

Then, the control unit 42 of the communication device 40 checks if the challenge that the contactless communication unit 41 of the communication device 40 has received from the information processing device 20 matches any of the previously generated challenges (step S305). Specifically, the communication device 40 compares a list of previously generated challenges which are the challenges stored in the storage unit 43 with the newly generated challenge at the information processing device 20. When the comparison result shows that the newly generated challenge does not match any of the generated challenges, the control unit 42 of the communication device 40 outputs the newly generated challenge as an unused challenge. Further, the control unit 42 of the communication device 40 adds the newly generated challenge to the list of generated challenges by allowing the storage unit 13 to store the newly generated challenge.

When the comparison result shows that the newly generated challenge matches any of the challenges previously generated, the process returns to step S302, in which the communication device 40 again requests the information processing device 20 to transmit the challenge. Then, the information processing device 20 repeats generation of a challenge, and the communication device 40 repeats checking of the challenge. Accordingly, step S302 to step S305 are repeated until a challenge which is different from the previously generated challenges is generated.

When checking the challenge, the communication device 40 may compare the challenges included in the list of the generated challenges with the newly generated challenge, or alternatively, the communication device 40 may compare the challenges for each ID of the information processing device 20.

When there is no unused challenge, or when a predetermined period of time has elapsed, the communication device 40 may delete the generated challenge stored in the storage unit 43. For example, in the case where an expected usage life of the IC tag as the information processing device 20 is one year, the control unit 42 of the communication device 40 deletes the challenge from the storage unit 43 when one year has elapsed from the generation of the challenge. Further, a starting point of the predetermined period of time is not only the time of generation of the challenge, but may be defined as appropriate.

Then, the control unit 42 of the communication device 40 generates a response by using the unused challenge (step S306). Specifically, the storage unit 43 of the communication device 40 generates a response on the basis of the parameter of PUF which is stored associated with the ID the same as the ID of the information processing device 20 received at step S304 and the unused challenge. Then, the contactless communication unit 41 of the communication device 40 transmits the generated response to the information processing device 20 (step S307).

Then, the PUF authentication processing unit 25 of the information processing device 20 performs authentication by using the response that the contactless communication unit 21 of the information processing device 20 received from the communication device 40 (step S308). Specifically, the information processing device 20 generates a comparison response by using the challenge transmitted to the communication device 40. When the authentication protocol based on PUF is used, the information processing device 20 generates a comparison response by using an output value from the PUF circuit 24 which is obtained by using the challenge transmitted to the communication device 40 as an input value. Then, the information processing device 20 compares the comparison response and the response received from the communication device 40, and determines whether the comparison response matches the received response or not.

When the comparison result shows that two responses match each other, authentication is successful and the information processing device 20 transmits the authentication result to the communication device 40 (step S309). Then, the communication device 40 starts processing (step S310). The processing performed by the communication device 40 may include reading and writing of the data contained in the information processing device 20. When the comparison result shows that two responses do not match each other, authentication is unsuccessful.

According to the aforementioned configuration, it is possible to achieve high security even if a set of the used challenge and response is intercepted or wiretapped since a challenge which has been used for authentication is prevented from being used again for authentication.

In the above example of information processing, an example is described in which the information processing device 20 performs authentication. However, mutual authentication is also possible in which the communication device 40 performs authentication.

In the third embodiment, the information processing device 20 is an example of the first device, and the communication device 40 is an example of the second device. Further, the second device determines whether the newly generated challenge matches the generated challenge or not.

Modification Examples

The above embodiment may be modified as described below.

In the third embodiment, the information processing device 20 may check the challenge, instead of the communication device 40. In this case, the storage unit 23 of the information processing device 20 stores the challenges which have been previously generated by the information processing device 20. Since the generated challenges stored in the storage unit 23 are the challenges previously generated by the information processing device 20, the generated challenge may optionally not be stored associated with the ID of the information processing device 20. In this embodiment, the information processing device 20 checks the challenge after it generates the challenge, and transmits the challenge outputted as an unused challenge to the communication device 40. Then, the communication device 40 generates a response by using the unused challenge, and transmits the generated response to the information processing device 20. After that, the information processing device 20 performs authentication by using the response received from the communication device 40 and the comparison response generated by the information processing device 20.

In this embodiment, the information processing device 20 is an example of the first device, and the communication device 40 is an example of the second device. Further, the first device determines whether the newly generated challenge matches the generated challenge or not.

In the third embodiment and the modified example of the third embodiment, challenge and response may be transmitted and received via the relay device 30 similar to the second embodiment. For example, in the third embodiment, the information processing device 20 transmits the challenge to the communication device 40 via the relay device 30, and the communication device 40 generates a response by using the unused challenge after it checks the challenge. Then, the communication device 40 transmit the response to the information processing device 20 via the relay device 30, and the information processing device 20 performs authentication on the basis of the response received from the communication device 40 and the comparison response generated by the information processing device 20. In this case, the contactless communication unit 31 of the relay device 30 serves as a relay challenge receiving unit and a relay response transmitting unit, and the communication unit 35 of the relay device 30 serves as a relay challenge transmitting unit and a relay response receiving unit. In this embodiment, the relay device 30 may store the challenges and transmit the response generated by using the challenge to the information processing device 20 so that the authentication of the relay device 30 is performed.

In the first embodiment and the second embodiment, the information processing device 20 may check the challenge. In this case, the storage unit 23 of the information processing device 20 stores the challenges previously generated by the authentication device 10. For example, in the first embodiment, the authentication device 10 transmits the generated challenge to the information processing device 20, and the information processing device 20 generates a response by using the unused challenge after it checks the challenge. Then, the information processing device 20 transmits the response to the authentication device 10, and the authentication device 10 performs authentication on the basis of the response received from the information processing device 20 and the comparison response generated by the authentication device 10.

In this embodiment, the authentication device 10 is an example of the first device, and the information processing device 20 is an example of the second device. Then, the second device determines whether the newly generated challenge matches the generated challenge or not.

The authentication protocol used in the authentication system is not limited to the challenge-response authentication protocol based on the PUF, and may be a method of generating a response from the challenge by using a predetermined authentication algorithm.

REFERENCE SIGNS LIST

10 authentication device, 11 contactless communication unit, 12 control unit, 13 storage unit, 14 PUF authentication processing unit, 15 challenge generating unit, 16 communication unit, 20 information processing device, 21 contactless communication unit, 22 control unit, 23 storage unit, 24 PUF circuit, 25 PUF authentication processing unit, 26 challenge generating unit, 30 relay device, 31 contactless communication unit, 32 control unit, 33 storage unit, 34 PUF circuit, 35 communication unit, 40 communication device, 41 contactless communication unit, 42 control unit, 43 storage unit

What is claimed is:

1. An authentication system comprising a first device, second device, and a relay device,
the first device including:
one or more processors and a memory;
a challenge generating unit adapted to generate a challenge;
a response receiving unit adapted to receive a response; and
an authentication processing unit adapted to perform authentication by using the challenge and the response,
one of the first device and the second device including:
a storage unit adapted to store generated challenges which are challenges previously generated;
a determination unit adapted to determine, during an authentication procedure, whether a newly generated challenge matches any of the generated challenges or not;
an output unit adapted to output the newly generated challenge as an unused challenge when the determination unit determines that the newly generated challenge does not match any of the generated challenges; and
a registration unit adapted to store the newly generated challenge as a new generated challenge in the storage unit when the determination unit determines that the newly generated challenge does not match any of the generated challenges,
wherein the one or more processors execute the challenge generating unit, the response receiving unit, the authentication processing unit, the determination unit, the output unit, and the registration unit; and
the second device including:
one or more processors and a memory;
a response generating unit adapted to generate the response by using the unused challenge; and
a response transmitting unit that transmits the response;
wherein the one or more processors execute the response generating unit; and
the relay device including:
one or more processors and a memory;
a physical unclonable function (PUF);
a storage unit adapted to store the challenge received from the first device;
a relay response generating unit adapted to generate a response on the basis of the PUF contained in the relay device by using the unused challenge,
a relay response transmitting unit adapted to transmit the response received from the second device and the response generated by the relay response generating unit to the first device,
wherein the one or more processors execute the relay response generating unit; and
the authentication processing unit of the first device performs authentication by using the unused challenge, the response generated by the response generating unit of the second device, and the response generated by the relay response generating unit of the relay device.

2. The authentication system of claim 1, wherein the registration unit deletes the generated challenges from the storage unit when a predetermined period of time has elapsed.

3. The authentication system of claim 1, wherein
the second device includes a PUF,
the response generating unit generates the response on the basis of the PUF by using the unused challenge,
the first device includes a storage unit that stores PUF information which represents a property of the PUF contained in the second device, and
the authentication processing unit performs authentication by using the unused challenge, the PUF information, and the response received from the second device.

4. The authentication system of claim 1, wherein
the first device includes a PUF,
the authentication processing unit performs the authentication on the basis of the PUF,
the second device includes a storage unit that stores PUF information which represents a property of the PUF contained in the first device, and
the response generating unit generates the response by using the unused challenge and the PUF information.

5. The authentication system of claim 1, wherein
the authentication system further includes a relay device,
the relay device includes:
  a relay challenge receiving unit that receives the challenge from the first device;
  a relay challenge transmitting unit that transmits the challenge received by the relay challenge receiving unit to the second device;
  a relay response receiving unit that receives the response from the second device; and
  a relay response transmitting unit that transmits the response received by the relay response receiving unit to the first device,
the first device transmits the challenge to the second device via the relay device, and
the second device transmits the response to the first device via the relay device.

* * * * *